June 26, 1956 V. A. WOODELL ET AL 2,752,039
AUTOMATIC RESISTANCE TESTER FOR RESISTOR PRODUCING SYSTEM
Filed April 24, 1952 3 Sheets-Sheet 1
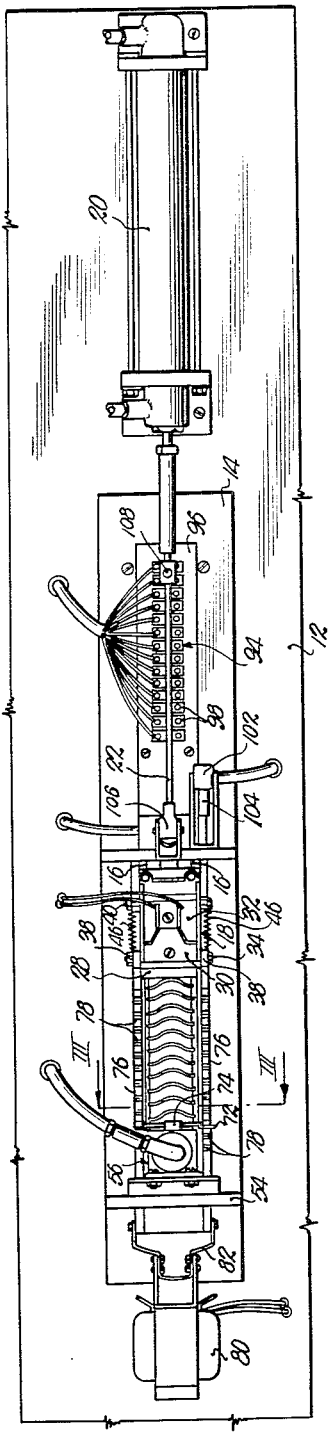
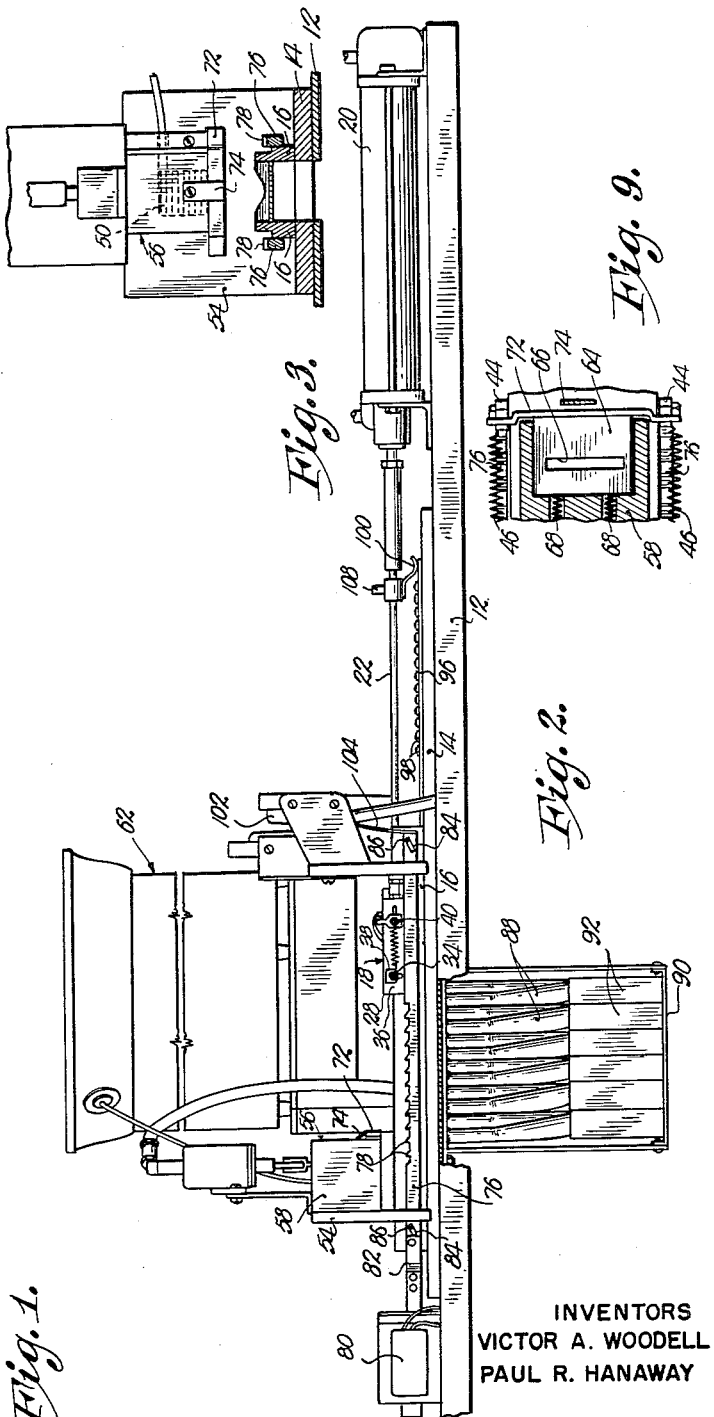
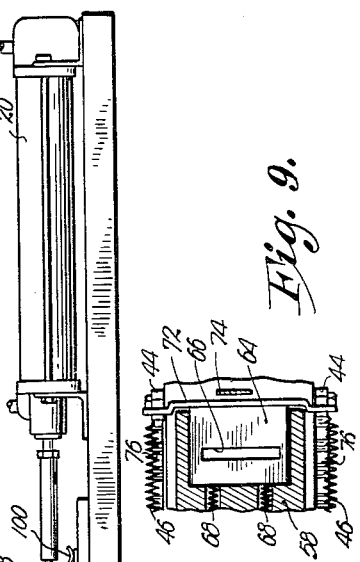
INVENTORS
VICTOR A. WOODELL
PAUL R. HANAWAY
BY
ATTORNEY.

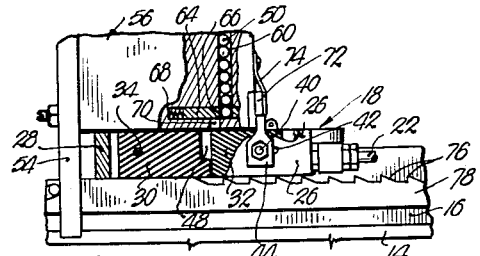
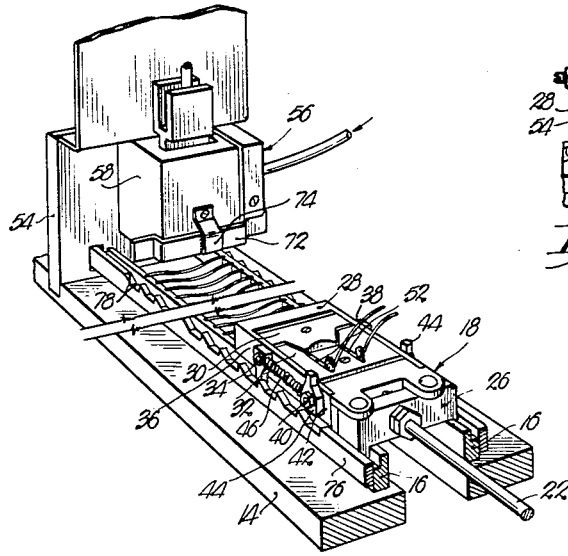
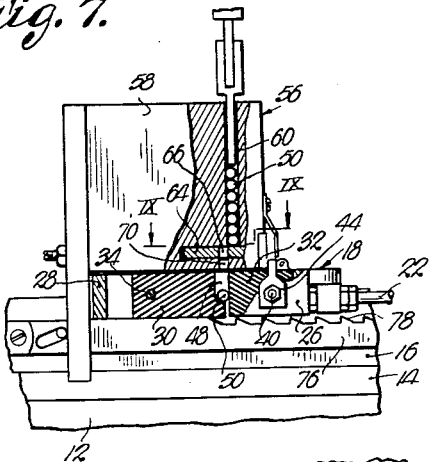
Fig. 4.  Fig. 7.  Fig. 8.
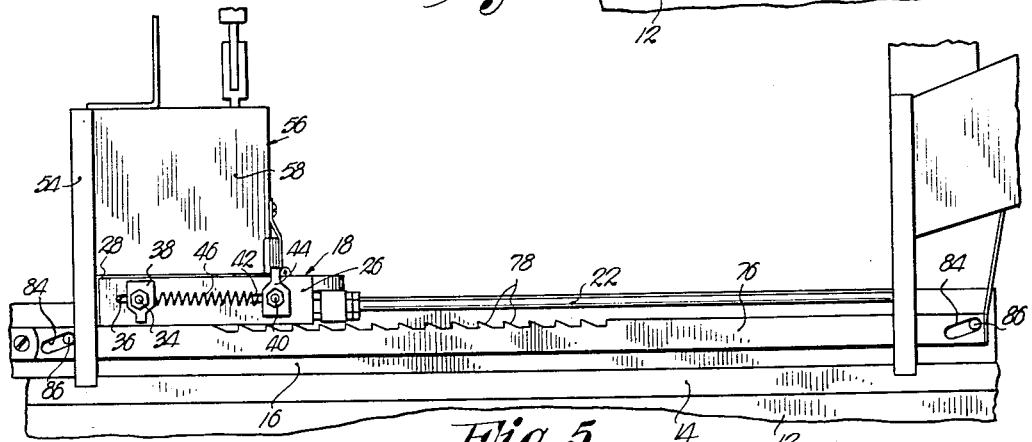
Fig. 5.
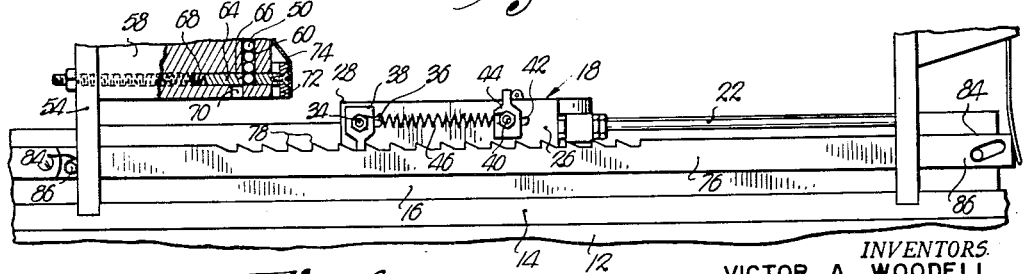
Fig. 6.
INVENTORS.
VICTOR A. WOODELL
PAUL R. HANAWAY
BY
ATTORNEY

INVENTORS
VICTOR A. WOODELL
PAUL R. HANAWAY

ATTORNEY.

2,752,039

Patented June 26, 1956

2,752,039

AUTOMATIC RESISTANCE TESTER FOR RESISTOR PRODUCING SYSTEM

Victor A. Woodell, Atchison, Kans., and Paul R. Hanaway, Independence, Mo., assignors to Electra Manufacturing Company, Kansas City, Mo., a corporation of Missouri Application April 24, 1952, Serial No. 284,098

11 Claims. (Cl. 209—81)

This invention relates to the manufacture of electrical resistors and more particularly to a machine for sorting the resistors in accordance with their resistance values, the primary object being to provide apparatus capable of automatically receiving and feeding a mass of resistors singly and continuously and also automatically to discharge the resistors into any one of a number of receptacles therefor to the end that within limits, the resistance values in each receptacle may be known and the resistors placed in use or finished for use accordingly.

For the most part, in present day manufacture of electrical resistors, each resistor must be handled separately, placed in a test circuit, its value determined, and thereupon the operator must place the tested resistor in a proper receptacle. This method is extremely slow and highly subject to errors. Dial reading of testers so used is tiresome and the operator is likely to misread the same. Further, it is quite common for the operator to place the tested resistor in the wrong receptacle.

It is the most important object of the present invention therefore, to tremendously speed up the testing and sorting operation necessary in the manufacture of electrical resistors and to eliminate error to an extent that assures the manufacturer that all resistors in any given receptacle used in connection with the machine, have resistance values within a predetermined range.

Another object hereof is to provide an automatic sorting machine that includes an electrical bridge provided with ratio arms, there being structure responsive to a predetermined output voltage of the bridge for automatically moving the resistor being tested and releasing the same into an underlying receptacle upon movement of the structure to a point where the bridge is unbalanced in the proper direction.

As will hereinafter appear, the sorting mechanism of the present invention includes a D. C. resistance bridge, an electronic voltage detector capable of operating a relay; a regulated D. C. power supply for operating an electronic circuit, an A. C. control circuit for operating the bridge, together with mechanism associated with the aforesaid electrical components for receiving a resistor from automatic feeding mechanism, moving the resistor and eventually bringing the bridge into unbalance in accordance with the resistance value of the resistor, together with apparatus for automatically releasing the resistor from the moving means therefor in response to the output voltage of the electrical bridge.

Another object includes the provision of a releasable jig for receiving and holding the resistor to be placed under test, the jig carrying a pair of contacts that engage the resistor and forms one of the ratio arms of the bridge, and the means for moving the jig being provided with a sliding contact within another ratio arm of the bridge that successively engages a plurality of resistances forming a third ratio arm of the electrical bridge, all for the purpose of operating jig releasing apparatus immediately upon existence of either a negative or positive in the electrical bridge or absence of output voltage in the measuring circuit.

Other objects include the way in which the automatic sorting bridge hereof is provided with a plurality of ranges, each of which in turn consists of a number of sorting positions; the manner of including a plurality of standards as one of the ratio arms of the bridge, which standards may be selectively coupled in the circuit; the way in which means is provided within the electronic circuit for calibrating the same; and many additional and important objects, all of which will be made clear as the following specification progresses, reference being had to the accompanying drawings, wherein:

Figure 1 is a top plan view of an automatic resistance tester for resistor producing systems made according to the present invention.

Fig. 2 is a side elevational view thereof.

Fig. 3 is a transverse, cross-sectional view taken on line III—III of Fig. 1.

Fig. 4 is a fragmentary, top perspective view showing particularly the reciprocable jig on an enlarged scale.

Fig. 5 is an enlarged, fragmentary, side elevational view similar to Fig. 2.

Fig. 6 is a view similar to Fig. 5, parts being in section but illustrating the jig intermediate the ends of its path of travel and in a released position.

Fig. 7 is an enlarged, elevational view showing a portion of the structure illustrated in Figs. 5 and 6, parts being broken away and in section to reveal details of construction.

Fig. 8 is a view similar to Fig. 7 but showing the resistor holding jig in a position for receiving a resistor from the feeding means.

Fig. 9 is a fragmentary, detailed, cross-sectional view taken on irregular line IX—IX of Fig. 8.

Figure 10:
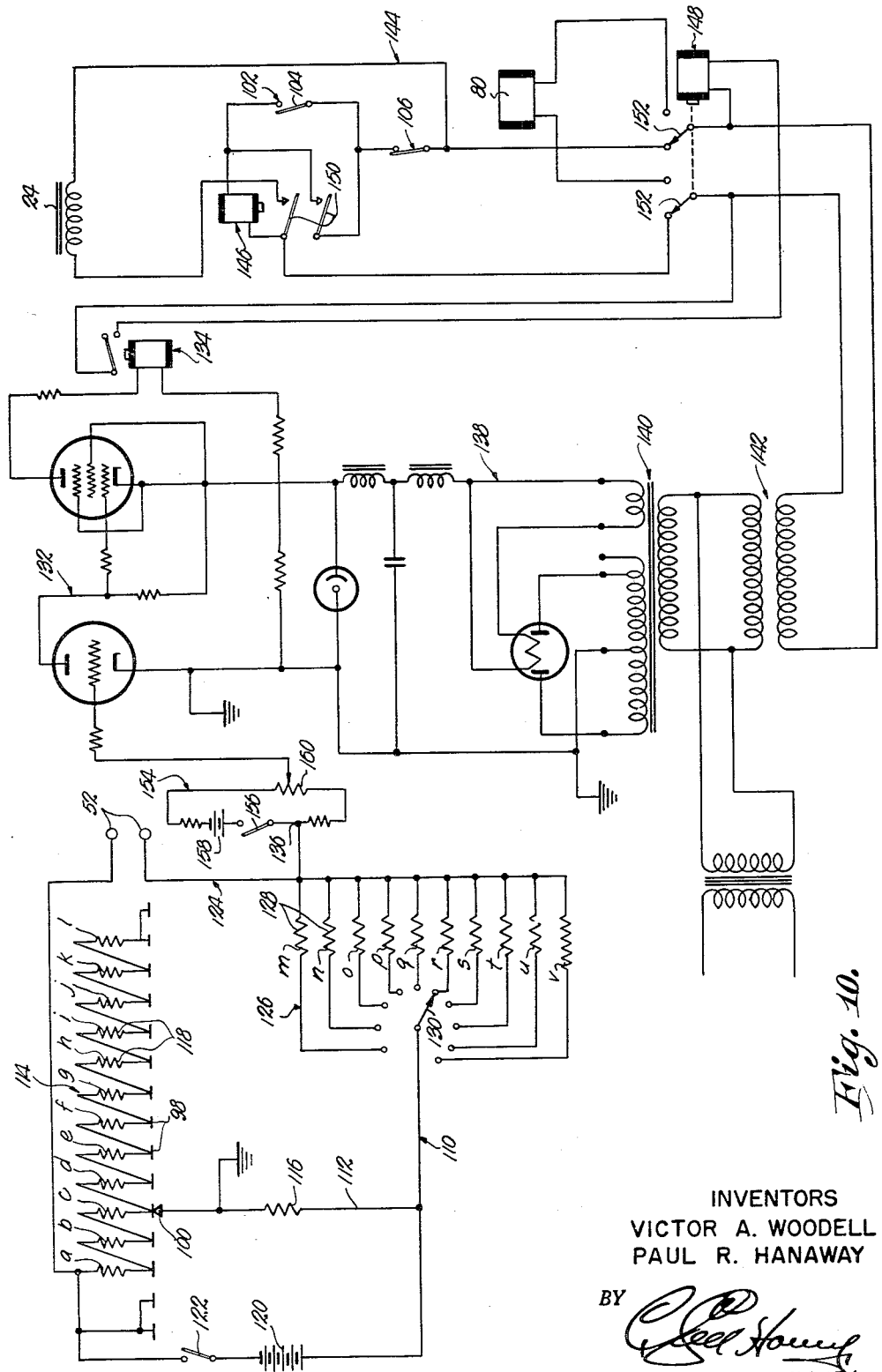
Fig. 10 is a schematic wiring diagram illustrating the electrical components of the resistance tester.

A support 12 in the nature of a table or the like, is illustrated in Figs. 1 and 2 of the drawings and upon which is mounted all of the mechanical elements of the machine about to be described. Table 12 has a polygonal frame 14 mounted thereon, which in turn carries a pair of spaced, elongated, L-shaped tracks 16 for guiding a jig broadly designated by the numeral 18, along a rectilinear path of travel. The jig 18 is coupled with a piston (not shown) reciprocably mounted within an air cylinder 20 by means of an elongated rod 22. The two-way air cylinder 20 is provided with valving means not shown, that is in turn controlled by a solenoid 24 (see Fig. 10).

The jig 18 has a U-shaped bar 26 secured to the rod 22 and slidably embracing the parallel tracks 16—16 in the manner illustrated in Fig. 4 of the drawings. A polygonal frame 28 is secured to the bar 26 for movement therewith, frame 28 embracing and supporting a pair of blocks 30 and 32 of electrical insulating material and mounted within the frame 28 for movement relatively toward and away from each other. A transverse pin 34 in the block 30 extends through opposed, elongated slots in the frame 28, one only of which is shown in Fig. 5 for example of the drawings, and designated by the numeral 36.

A pair of down-turned dogs 38 are mounted securely on the pin 34 exteriorly of the frame 28.

The block 32 likewise carries a transverse pin 40 that rides in opposed, elongated slots 42 formed in the frame 28, and a pair of up-turned dogs 44 are secured to the ends of the pin 40. It is thus seen that the blocks 30 and 32 may reciprocate within the slots 36 and 42 along a path of travel coincident with the reciprocable path of travel of jig 18 as a unit. The blocks 30 and 32 are held biased toward each other by springs 46 that interconnect the pins 34 and 40. The proximal and inner faces of the blocks 30 and 32 are formed as best illustrated in Fig. 8 of the drawings to prevent a cavity 48 having a bottom wall to receive and support a resistor 50 to be placed under test and when the resistor 50 is within the cavity 48, the springs 46—46 hold the resistor 50 tightly against a pair of L-shaped contacts 52, carried by the block 32. One leg of each of the contacts 52—52 extends downwardly between the blocks 30 and 32, these contacts 52—52 also being illustrated in Fig. 10 of the drawings.

The frame 14 has an upstanding plate 54 at that end thereof opposite to the air cylinder 20, for mounting a feeder broadly designated by the numeral 56. Feeder 56 includes a body 58 having a vertical passage 60 for receiving the resistors 50 from apparatus 62 capable of receiving a supply of the resistors 50 and dispensing the same automatically and singly into the passage 60.

The nature of the apparatus 62 forms no part of this invention and therefore, need not be further described. A plate 64 slidable within the body 58 beneath the passage 60, has an elongated opening 66 therein (see Fig. 9) for receiving a single resistor 50 from the passage 60 when the plate 64 is at the outermost end of its path of travel. Inward movement of the plate 64 against the action of a spring 68 transfers a resistor 50 from the opening 66 to an outlet slot 70 in the body 58, offset with respect to the passage 60.

It is thus seen that when the cavity 48 between the blocks 30 and 32 is beneath the slot 70, resistor 50 will gravitate from the body 58 into the cavity 48. Plate 64 is provided with a bracket 72 within the path of travel of the dogs 44—44 to the end that when the jig 18 moves to that end of its path of travel adjacent the plate 54, the plate 64 will be actuated to feed a resistor 50 as just above described. A stop 74 on the body 58 limits the extent of outward movement of the plate 64 as influenced by spring 68. Spring means 68 is relatively weak as compared with the springs 46—46 to the end that as the dogs 44—44 come into contact with the bracket 72, plate 64 will first be actuated, whereupon after bracket 72 comes into engagement with body 58, continued movement of the jig toward the plate 54, will cause separation of the blocks 30 and 32 so that the same will readily receive the resistor 50 therebetween. In other words, after bracket 72 strikes body 58, frame 28 will continue to move toward plate 54 relative to block 32, pin 40 and dogs 44—44. Frame 28, acting on the pin 34, will shift the block 30 away from the block 32 against the action of springs 46—46.

A pair of elongated racks 76 alongside the tracks 16—16, are each provided with a series of teeth 78 and extend through the plate 54 as shown in Fig. 4 of the drawings, for attachment with the reciprocable core of a solenoid 80 (see also Fig. 10) by means of a yoke 82. The racks 76 are carried by the corresponding tracks 16—16 by means of a pair of oblique, parallel slots 84 formed in the racks 76 and corresponding pins 86 extending outwardly from the tracks 16. Racks 76 are shiftable to move the teeth 78 thereof into and out of the path of travel of the dogs 38 upon operation of the solenoid 80.

A plurality of resistor-receiving chutes 88 depend from the table 12 and terminate in open ends as shown in Figs. 1 and 4 adjacent the uppermost surface of table 12, between the tracks 16 within frame 14. A shelf 90 supports a receptacle 92 for each chute 88 respectively.

A commutator, broadly designated by the numeral 94 is mounted on a strip of insulation 96 on frame 14 and includes a series of spaced-apart contact plates 98 within the path of travel of a spring contact 100 mounted on the rod 22 for reciprocation therewith. The contact plates 98, as well as the sliding contact 100, are also illustrated schematically in Fig. 10 of the drawings, and carry the same reference numerals.

A switch 102 normally open as shown in Fig. 10, has its actuating finger 104 disposed within the path of travel of one of the racks 76 as shown in Figs. 2, 5 and 6 of the drawings. A second switch 106 is disposed adjacent the switch 102 within the path of travel of a pin 108 for closing thereby, pin 108 being carried by the rod 22 and switch 106 being shown in Figs. 1 and 10 only.

A D. C. resistance bridge broadly designated by the numeral 110, and shown in Fig. 10 of the drawings, includes the commutator plates 98, the sliding contact 100 and the spaced contacts 52 that engage a resistor 50 within the holding jig 18. The electric bridge 110 includes a pair of ratio arms 112 and 114, the sliding contact 100, and a fixed resistance 116 forming a part of the ratio arm 112. Ratio arm 114 is composed of a plurality of series coupled standard resistances 118, together with the commutator plates 98, it being noted that the first two commutator plates 98 have no resistance therein and that the last two plates 98 are provided with a common standard 118.

A source of D. C. operating voltage is shown by way of example only as constituting a battery 120 preferably of approximately 12 volts, which is connected across two of the diagonal points of the bridge 110, bridge 110 also being provided with a control switch 122. The third ratio arm of the bridge 110 is broadly designated by the numeral 124 and includes the spaced-apart contacts 52. A fourth ratio arm 126, includes a plurality of standard resistances 128, together with a sweep switch 130 for selectively connecting any one of the standards 128 within the ratio arm 126 of the bridge circuit 110.

An electronic circuit, broadly designated by the numeral 132, is operably coupled with the bridge 110 and comprises a 2-stage D. C. amplifier for controlling the flow of current through a relay 134 within the plate circuit of the second-stage of amplification as is clear in Fig. 10 of the drawings.

The electronic circuit 132 is designed to operate the relay 134 when the bridge circuit 110 presents zero or negative voltage at point 136 as will hereinafter appear. The power supply for electronic circuit 132 is designated broadly by the numeral 138 and includes a power transformer 140 as well as a regulator transformer 142.

An A. C. control circuit 144 includes in addition to the solenoids 24 and 80, and switches 102 and 106, a pair of relays 146 and 148. Relay 146 has a pair of normally open switches 150 and relay 148 is provided with a pair of double pole, double throw switches 152. A bias adjusting circuit 154 is provided to cause operation of relay 134 as above mentioned when the bridge circuit 110 presents a zero or a negative voltage at point 136. Manifestly, when the switch 122 of the bridge circuit 110 is open, no voltage is applied to the bridge circuit 110 and therefore, there is no voltage appearing at point 136, simulating therefore a balanced bridge condition. Calibration is effected by closing a switch 156 forming a part of the circuit 154, thereby applying approximately 3 volts by means of a small battery 158 across the bias adjusting circuit 154. This produces a negative voltage to the input of the electronic circuit 132, which negative voltage can be varied merely by changing the position of a rheostat 160 in the circuit 154. Rheostat 160 is adjusted until relay 134 commences to operate, whereby the electronic circuit 132 is calibrated so that relay 134 operates when the bridge 110 is balanced.

In order to adequately explain the operation of the machine above set forth, the 12 resistances 118 may, by way of example, be designated as "a to l" inclusive with the value of resistance "a" set at 375 ohms for instance, resistances "b to k" inclusive as 25 ohms each, and resistance "l" as 50,000 ohms. The resistances 118 being series coupled, their values are cumulative to the end that when the sliding contact 100 is positioned as shown in Fig. 10 of the drawings, the resistance value of the ratio arm 114 is 425 ohms.

Manifestly, the same results could be accomplished by providing a plurality of resistors 118 connected in parallel with resistance "b" having a value of 400 ohms, resistance "c" having a value of 425 ohms, etc.

Continuing with the hypothetical example, resistance 116 in the ratio arm 112, may have a value of 500 ohms and the standards 128 may be designated by "m to v" inclusive. It may be assumed that the ohmage value of standard "m" is 100, of standard "n" 160, standard "o" 240, standard "p" 360, standard "q" 560, standard "r" 880, standard "s" 1400, standard "t" 2240, standard "u" 3600, and standards "v" 5600 ohms.

It is now clear that when bridge 110 is balanced, that is when the ratio of the arm 114 to the arm 112 is equal to the ratio of a resistor 50 being tested, to a selected standard resistor 128, no voltage appears at point 136 with respect to ground. When the resistor 50 being tested is high, causing the ratio between resistor 50 and a standard 128 to be higher than the ratio between arm 114 and 112, a positive voltage appears at point 136. Conversely, when the resistance value of a resistor 50 being tested is relatively low, and the ratio between such test resistor and the arm 126 is lower than the ratio between arms 114 and 112, a negative voltage appears at point 136. It is this negative output voltage of the circuit 110 that places the electronic circuit 132 into operation to energize the solenoid 80 and thereby to cause the resistor 50 to drop from the jig into a chute 88 and thence into one of the receptacles 92. Inasmuch as the sliding of the contact 100 across the commutator 94 causes the variable ratio arm 114 to vary from low to high, the resistor 50 being carried by the jig 18, will be dropped into a sorting chute 88 at the first position that causes the ratio of arm 124 to arm 126 to be lower than the ratio of arm 114 to arm 112. Let it be assumed therefore, that the switch 130 is moved to a position placing the 100 ohm standard resistance "m" into the arm 126 of bridge 110, and let it be assumed further that a resistor 50 is positioned within the jig 18 and held tightly against the contacts 52 by the action of springs 46. As soon as the plunger of cylinder 20 is retracted, jig 18 will be pulled along the tracks 16 away from the plate 54 toward the switch 102.

The sliding contact 100 will first engage the first two commutator plates 98 adjacent switch 122 in Fig. 10, and, by virtue of the fact that the arm 114 has zero resistance, there will be no energization of the solenoid 80 while the jig 18 is in the loading position. Contact 100 next moves into engagement with the plate 98 corresponding to resistance "a," producing 375 ohms resistance in the variable arm 114 which is 25% lower than the 500 ohm resistance 116 of the fixed ratio arm 112.

If the resistor 50 being carried by jig 18 has a value of 75 ohms, then the ratio of arm 124 to arm 126, is the same as the ratio of arm 114 to arm 112 when the contact 100 is adjacent the resistance "a." The circuit 110 will therefore, be in balance and, as above indicated, the circuit 154 is calibrated to cause operation of relay 134 when the circuit 110 is in balance. Closing of the relay 134 energizes the coil of relay 148 to swing the switches 152 of relay 148 from the position shown in Fig. 10 to the opposite end of their paths of travel in series with the solenoid 80. Solenoid 80 receiving energy from the source 142, shifts the racks 76 from the normal inoperative position shown in Fig. 5 of the drawings, forwardly and upwardly toward the cylinder 20 as guided by the pins 86 and slots 84. Such upward movement of the racks 76 places the teeth 78 in the path of travel of the down-turned dogs 38, thereby retarding further movement of the dogs 38 and accordingly, of the pin 34 and block 30 toward the cylinder 20. As rod 22 continues to move toward the cylinder 20 against the action of springs 46, block 32 will move away from the block 30, releasing resistor 50 having a resistance value of 75 ohms or less, from the cavity 48 and into the first chute 88, as well as the first underlying receptacle 92.

As the racks 76 move upwardly and forwardly toward the cylinder 20, engaging switch arm 104, switch 102 is closed. As soon as the resistor 50 drops from the jig, relay 134 thereby deenergizes the relay 148 and the solenoid 80. However, the jig 18 and particularly the dogs 38 thereof remain pulled tightly against the teeth 78 by the action of the cylinder 20, and the switch 102 remains closed. This energizes the relay 146 as soon as relay 148 becomes deenergized and the switches 152 return to the normal position shown in Fig. 10. Closing of one of the switches 150 of relay 146 causes energization of the solenoid 24, and closing of the other switch 150 closes a holding circuit for the relay 146.

Energization of the solenoid 24 reverses the position of the control valves for the air cylinder 20, whereupon the rod 22 returns toward the loading position adjacent plate 54 and beneath feeding means 56. As soon as the racks 76 drop, the switch 102 opens, but the relay 146 remains energized by virtue of its holding circuit. As soon as jig 18 reaches that end of its path of travel adjacent plate 54, and after the same receives another resistor 50 from the slot 70, pin 108 will have moved against switch 106 to open the same. This deenergizes the relay 146, causing switches 150—150 to open. The solenoid 24 deenergizes again, reversing the valves controlling the cylinder 20 and causing the jig 18 to start its path of travel back toward the cylinder 20.

The above operation assumed that the resistor 50 tested at a resistance value of 75 ohms or less. In the event that the resistor being tested has a value of 80 ohms or less, it will be dropped in the second receptacle 92. This is by virtue of the fact that the resistor "b" produces 400 ohms resistance in the variable ratio arm 114. It follows therefore, that resistors having a value between 75 and 80 ohms will fall in the second receptacle 92; 80 to 85 ohms in the third receptacle 92; and so on. The resistors 50 will thereby be sorted into resistance groups covering an approximate 5 ohm resistance range.

By virtue of the ten standards 128, bridge 110 is equipped with ten ranges, each range consisting of ten 5 ohm groups, together with one high and one low sorting position. All resistors over 125 ohms will fall into the last receptacle 92 when the standard "m" is coupled in the arm 126 of the bridge circuit 110. While only one range can be sorted at one time, the resistors 50 falling into the "High" group, i. e. above 125 ohms, the resistors falling into the "Low" group, namely 75 ohms or less, may be re-sorted in a higher resistance range by merely repositioning the switch 130 and redirecting the "High" ohmage resistors through the apparatus 62 and the feeder 56. It is of course, to be preferred that the resistors be sorted by switching the bridge switch 130 to the range that best covers the resistance range of any group of resistors 50.

It is now clear that the sorting machine hereof is entirely automatic, needing no operator attention whatsoever. When the machine is shut down, relay 146 becomes immediately deenergized, whereupon the jig 18 returns to that end of its path of travel remote from the loading position beneath feeder 56. Operation can be resumed after closing of switch 122 by merely manually closing the switch 102, thereby energizing relay 146 to cause the jig 18 to commence its travel toward the loading position adjacent plate 54.

When the machine is thus placed in operation, resistors 50 will be continually fed singly from the apparatus 62 to the feeder 56 and thence to the jig 18 each time the latter moves beneath the slot 70. The distance of travel of the jig 18 away from the plate 54, depends upon the resistance value of the resistor 50 within cavity 48, for, as above made clear, the operation of the solenoid 80 depends entirely upon the resistance value of the resistor 50 being tested. As soon as a resistor 50 is dropped into one of the receptacles 92 as determined by the output voltage of the bridge 110, energization of solenoid 24 causes reversal of the air valve 20 and return of the jig 18 to a position for receiving another resistor 50.

The machine is extremely accurate within the range herein selected and it is manifest that by changing the various resistance value of the resistors used in the bridge circuit 110, the 5 ohm range above mentioned, may be changed to suit the desires of the manufacturer.

It is also clear that the number of standards 128, as well as their values, may be varied and that the number of resistors 118 in the arm 114, may vary, whereupon a greater or lesser number of chutes 88 and receptacles 92 will be utilized in the machine.

Manifestly, it is immaterial whether or not there is a normal output in the measuring circuit during the time no resistor 50 is coupled in the circuit. And, if a potential is maintained when the jig 18 is empty, the polarity may be either positive or negative.

These and many other changes and modifications manifestly come within the spirit of this invention and it is, therefore, desired to be limited only by the scope of the appended claims.

Having thus described the invention, what is claimed as new and desired to be secured by Letters Patent is:

1. In a machine for automatically sorting electrical devices into a plurality of groups with a number of said groups each consisting of a range having a known maximum and a known minimum electrical value, the maximum values of the ranges progressively increasing, said machine including releasable structure for holding one of said devices, said structure being movable; means for moving said structure; a bridge circuit; means coupling said one device electrically within the circuit while the one device is held and moved by said structure; means forming a part of said bridge for introducing progressively increased resistance into series with said one device as the latter is moved in one direction by said structure, whereby the current flow of said circuit is varied as the structure is moved; and means responsive to a predetermined current flow in said circuit for releasing said structure and thereby said one device held by the structure, said releasing means being electrically coupled with said circuit and operably connected with said structure.

2. In a machine for automatically sorting electrical resistors into a plurality of groups with a number of said groups each consisting of a range having a known maximum and a known minimum resistance, the maximum resistances of the ranges progressively increasing, said machine including releasable structure for holding one of said resistors, said structure being movable; means for moving said structure; a bridge circuit; means coupling said one resistor electrically within the circuit while the one resistor is held and moved by said structure; a control coupled in the circuit and forming a part thereof, said control including means for supplying varying resistance to the circuit, a contactor movable with said structure, and a series of stationary contacts successively engageable by the contactor, whereby the current flow of said circuit is varied as the structure is moved to shift the one resistor; and means responsive to a predetermined current flow in said circuit for releasing said structure and thereby said one resistor held by the structure, said releasing means being electrically coupled with said circuit and operably connected with said structure.

3. In a machine for automatically sorting electrical resistors into a plurality of groups with a number of said groups each consisting of a range having a known maximum and a known minimum resistance, the maximum resistances of the ranges progressively increasing, said machine including releasable structure for holding one of said resistors, said structure being movable; means for moving said structure; a bridge circuit; means coupling said one resistor electrically within the circuit while the one resistor is held and moved by said structure; a control coupled in the circuit and forming a part thereof, said control including means for supplying varying resistance to the circuit, a contactor movable with said structure, an a series of stationary contacts successively engageable by the contactor, whereby the current flow of said circuit is varied as the structure is moved to shift the one resistor; and means responsive to a predetermined current flow in said circuit for releasing said structure and thereby said one resistor held by the structure, said releasing means being electrically coupled with said circuit and operably connected with said structure, said means for supplying varying resistance including an impedance coupled with each contact respectively.

4. In a machine for automatically sorting electrical resistors into a plurality of groups with a number of said groups each consisting of a range having a known maximum and a known minimum resistance, the maximum resistances of the ranges progressively increasing, said machine including releasable structure for holding one of said resistors, said structure being movable; means for moving said structure; an electric, resistance-measuring bridge circuit; means coupling said one resistor electrically within the circuit while the one resistor is held and moved by said structure; a control coupled in the circuit and forming a part thereof, said control including means for supplying varying resistance to the circuit, a contactor movable with said structure, and a series of stationary contacts successively engageable by the contactor, whereby the current flow of said circuit is varied as the structure is moved to shift the one resistor; and means responsive to a predetermined current flow in said circuit for releasing said structure and thereby said one resistor held by the structure, said releasing means being electrically coupled with said circuit and operably connected with said structure, said circuit including a number of ratio arms, said means for supplying varying resistance including an impedance coupled with each contact respectively, said impedances forming one of the ratio arms, said contactor forming a part of a second of said ratio arms.

5. In a machine for automatically sorting electrical resistors into a plurality of groups with a number of said groups each consisting of a range having a known maximum and a known minimum resistance, the maximum resistances of the ranges progressively increasing, said machine including an electric, resistance-measuring circuit having two pairs of ratio arms; a number of resistances coupled in one of said ratio arms; means coupling one of said resistors within a second of said ratio arms; releasable structure for holding said one resistor while the same is coupled in said second ratio arm, said structure being shiftable; means for shifting said structure; means responsive to a predetermined current flow in said circuit for releasing said structure and thereby said one resistor, said releasing means being electrically coupled with said circuit and operably connected with said structure; and means for shifting said one ratio arm with respect to a third of said ratio arms simultaneously with the shifting of said structure to establish a ratio comparison between the two pair of ratio arms capable of producing said predetermined current flow and thereby release the one resistor.

6. In a machine for automatically sorting electrical resistors into a plurality of groups with a number of said groups each consisting of a range having a known maximum and a known minimum resistance, the maximum resistances of the ranges progressively increasing, reciprocable structure having a releasable, resistor-receiving jig; mechanism shiftable into and out of the path of travel of said jig for releasing the same; an electrical measuring circuit; means coupling said circuit with a resistor carried by the jig; means forming a part of said circuit for measuring the resistance of said resistor as the same is moved by the reciprocable structure; and means coupling said circuit with said mechanism and responsive to said resistance for actuating the mechanism and thereby release the resistor at a point along the path of travel of the structure corresponding to said resistance.

7. In a machine for automatically sorting electrical resistors into a plurality of groups with a number of said groups each consisting of a range having a known maximum and a known minimum resistance, the maximum resistances of the ranges progressively increasing, a resistor feeder; a reciprocable carrier having a releasable jig movable to and from a position for receiving resistors singly from the feeder; mechanism movable to and from a position within the path of travel of the jig as the carrier moves away from the feeder for releasing the jig; and an electric measuring circuit coupled with a resistor in the jig for operating said mechanism in accordance with the electrical resistance of said resistor.

8. In a machine as set forth in claim 7 wherein is provided a plurality of resistances in said circuit, and means for successively bringing the resistances in the circuit as the carrier is moved away from the feeder.

9. In a machine as set forth in claim 7 wherein reversible means is provided for reciprocating said carrier, and means for reversing said reversible means upon operation of said mechanism.

10. In a machine for automatically sorting electrical resistors into a plurality of groups with a number of said groups each consisting of a range having a known maximum and a known minimum resistance, the maximum resistances of the ranges progressively increasing, a series of open top receptacles; structure reciprocable above said receptacles; a resistor-receiving jig forming a part of said structure; releasable means for holding a resistor in the jig as said structure is moved; an electric, resistance-measuring circuit coupled with the resistor when the same is held in the jig; a plurality of resistances forming a part of said circuit; means for successively bringing the resistances into the circuit as the structure is moved; and means responsive to a predetermined current output in said circuit for releasing said holding means to release said resistor into one of said receptacles corresponding to the resistance of said resistor.

11. In a machine for automatically sorting electrical resistors into a plurality of groups with a number of said groups each consisting of a range having a known maximum and a known minimum resistance, the maximum resistances of the ranges progressively increasing, an electric measuring circuit including a first ratio arm having a resistance therein, a second ratio arm having a plurality of resistances, a third ratio arm interconnecting the first and second ratio arms and adapted for coupling with a movable resistor, and a fourth ratio arm connected with said first ratio arm and having a resistance therein; means for imparting relative movement to said fourth ratio arm and said plurality of resistances as the resistor is moved; and means for disconnecting said resistor from the third ratio arm according to the electrical resistance of the resistor in response to a predetermined current output in said circuit.

References Cited in the file of this patent

UNITED STATES PATENTS

| | | |
|---|---|---|
| 1,832,948 | Schmidt | Nov. 24, 1931 |
| 2,278,697 | Gould | Apr. 7, 1942 |
| 2,468,843 | Sunstein | May 3, 1949 |
| 2,488,609 | Smith | Nov. 22, 1949 |